US009994134B2

(12) United States Patent
Line et al.

(10) Patent No.: US 9,994,134 B2
(45) Date of Patent: *Jun. 12, 2018

(54) SEAT CUSHION PAN ASSEMBLY

(71) Applicant: Ford Global Technologies, LLC, Dearborn, MI (US)

(72) Inventors: Johnathan Andrew Line, Northville, MI (US); Daniel J. Osterhoff, Northville, MI (US); Raghavan Setlur, West Bloomfield, MI (US); Robert Damerow, Garden City, MI (US); Majid Arefi, West Bloomfield, MI (US); Mandeep Singh Sidhu, Canton, MI (US); Brandon Guinn, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/097,907

(22) Filed: Apr. 13, 2016

(65) Prior Publication Data

US 2016/0221483 A1 Aug. 4, 2016

Related U.S. Application Data

(63) Continuation of application No. 13/932,427, filed on Jul. 1, 2013, now Pat. No. 9,340,162.

(51) Int. Cl.
*A47C 7/00* (2006.01)
*B60N 2/48* (2006.01)
(Continued)

(52) U.S. Cl.
CPC ........... *B60N 2/487* (2013.01); *B60N 2/4263* (2013.01); *B60N 2/66* (2013.01); *B60N 2/68* (2013.01);
(Continued)

(58) Field of Classification Search
CPC .. B60N 2/7094; B60N 2/686; B60N 2/42709; B60N 2/68; B60N 2/449; B60N 2/682
See application file for complete search history.

(56) References Cited

U.S. PATENT DOCUMENTS 3,848,925 A 11/1974 Harder, Jr.
4,065,181 A * 12/1977 Gunlock .............. B60N 2/7023
297/440.22
(Continued)

FOREIGN PATENT DOCUMENTS

DE 102010021744 A1 12/2011
EP 1564067 A1 8/2005

OTHER PUBLICATIONS

"Innovation Seat Tray," http://www.marutiwagonr.com/, Nov. 27, 2012 (1 page).
(Continued)

*Primary Examiner* — David E Allred
(74) *Attorney, Agent, or Firm* — Vichit Chea; Price Heneveld LLP

(57) ABSTRACT

A vehicle seating assembly having a seat back including a polymeric body portion defining a support frame having a plurality of forwardly extending connection pins disposed about a periphery of a forward surface of the support frame. A flexible comfort carrier is disposed over a front surface of the polymeric body portion and includes a multitude of openings defining a support matrix configured to support the weight of a passenger. The body portion includes a plurality of slots configured to receive and engage the plurality of forwardly extending connection pins. A cushion layer extends over the flexible comfort carrier. A head restraint extends upwardly from the forward support frame.

10 Claims, 22 Drawing Sheets

(51) Int. Cl.
  *B60R 7/04* (2006.01)
  *B60N 2/66* (2006.01)
  *B60N 2/68* (2006.01)
  *B60N 2/70* (2006.01)
  *B60N 2/42* (2006.01)

(52) U.S. Cl.
  CPC ............ *B60N 2/686* (2013.01); *B60N 2/7035* (2013.01); *B60N 2/809* (2018.02); *B60N 2/856* (2018.02); *B60N 2/874* (2018.02); *B60R 7/043* (2013.01)

(56) References Cited

U.S. PATENT DOCUMENTS

| | | |
|---|---|---|
| 4,761,034 A | 8/1988 | Saito |
| 5,662,381 A | 9/1997 | Roossien et al. |
| 5,725,277 A | 3/1998 | Knoblock |
| 5,779,317 A * | 7/1998 | Neal ............... A47C 7/40 297/440.2 |
| 5,816,650 A | 10/1998 | Lucas, Jr. |
| 6,102,463 A | 8/2000 | Swanson et al. |
| 6,257,665 B1 * | 7/2001 | Nagamitsu ......... A47C 7/405 297/285 |
| 6,419,313 B1 | 7/2002 | Newman |
| 7,128,373 B2 | 10/2006 | Kurtycz et al. |
| 7,290,836 B2 | 11/2007 | Nordstrom et al. |
| 7,523,985 B2 | 4/2009 | Bhatia et al. |
| 7,850,247 B2 * | 12/2010 | Stauske ............ B60N 2/5621 297/452.24 |
| 7,891,740 B2 | 2/2011 | Boes |
| 8,590,978 B2 * | 11/2013 | Jaranson ............ B60N 2/643 297/218.1 |
| 8,733,834 B2 | 5/2014 | Palmer |
| 8,807,594 B2 * | 8/2014 | Mizobata ............ B60N 2/6009 280/730.2 |
| 9,126,508 B2 * | 9/2015 | Line .................. B60N 2/2222 |
| 9,315,131 B2 * | 4/2016 | Line ...................... B60N 2/54 |
| 9,340,162 B2 * | 5/2016 | Line .................. B60N 2/4802 |
| 2002/0079732 A1 | 6/2002 | Saberan et al. |
| 2009/0195035 A1 | 8/2009 | Ripley et al. |
| 2010/0171346 A1 | 7/2010 | Laframboise et al. |
| 2011/0148173 A1 | 6/2011 | Westerink et al. |
| 2011/0316320 A1 | 12/2011 | Kulkarni et al. |
| 2012/0267935 A1 | 10/2012 | Zekavica et al. |
| 2013/0320742 A1 * | 12/2013 | Murolo .............. B60N 2/68 297/452.18 |
| 2014/0077548 A1 * | 3/2014 | Peterson ............ A47C 1/024 297/284.4 |

OTHER PUBLICATIONS

"Under Seat Storage," http://www.accuride-europe.com/Case-Studies/Automotive/Under-Seat-Storage-For-Cars, Nov. 27, 2012 (1 page).

"Mazda 5," http://ww.caranddriver.com/photos-10q1/322734/2011-mazda-5-middle-row-under-seat-storage-photo-333375, Nov. 27, 2012 (2 pages).

Thryft, Ann R., "'Performance' Car Seat Eliminates Steel," DesignNews, Jan. 30, 2012, http://www.designnews.com/document.asp?doc_id=2375048<print=yes (3 pages).

Composites Manufacturing Online, "New Composite Car Seat for Midmarket Vehicles," Feb. 4, 2012, http://www.compositesmanufacturingblog.com/2012/02/new-composite-car-seat-for-midmarket-vehicles (1 page).

* cited by examiner

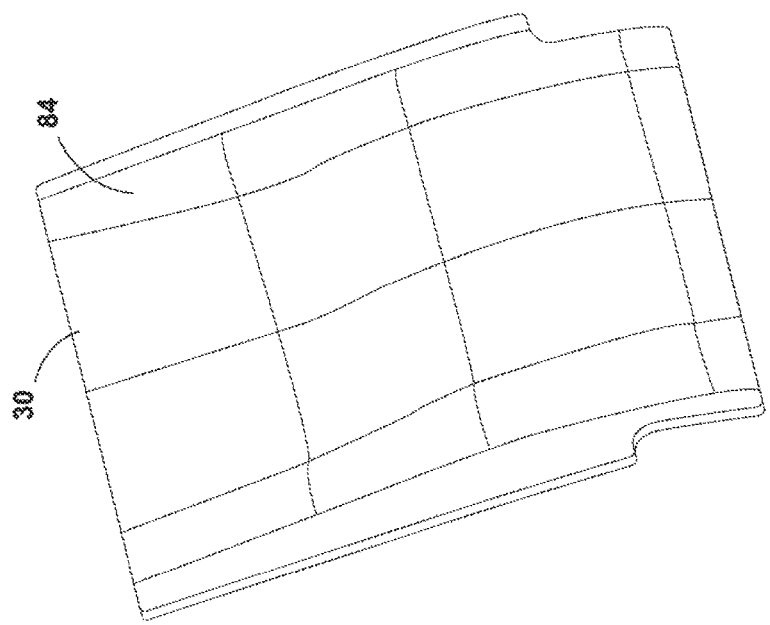
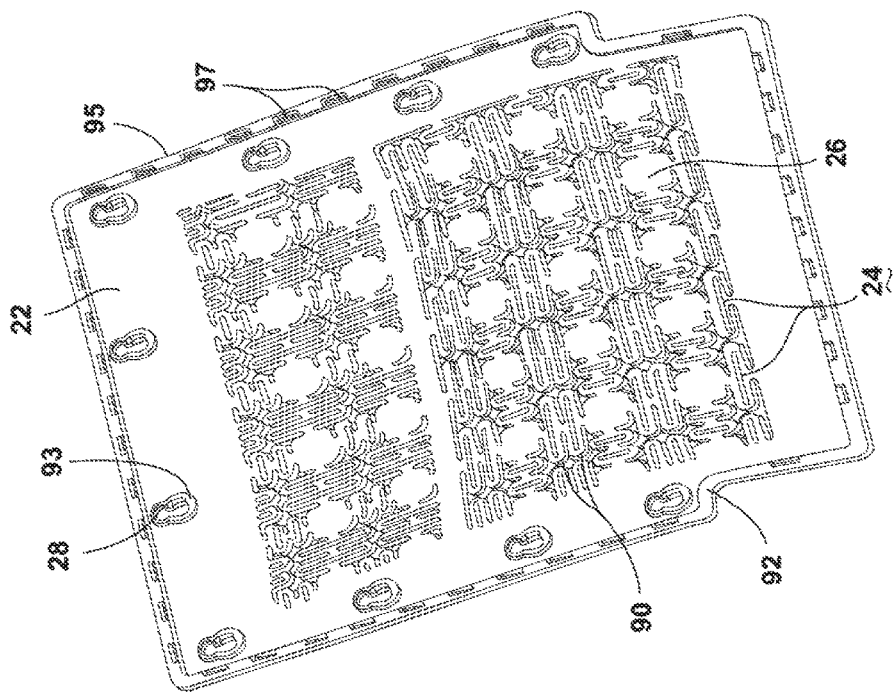
FIG. 8
FIG. 7

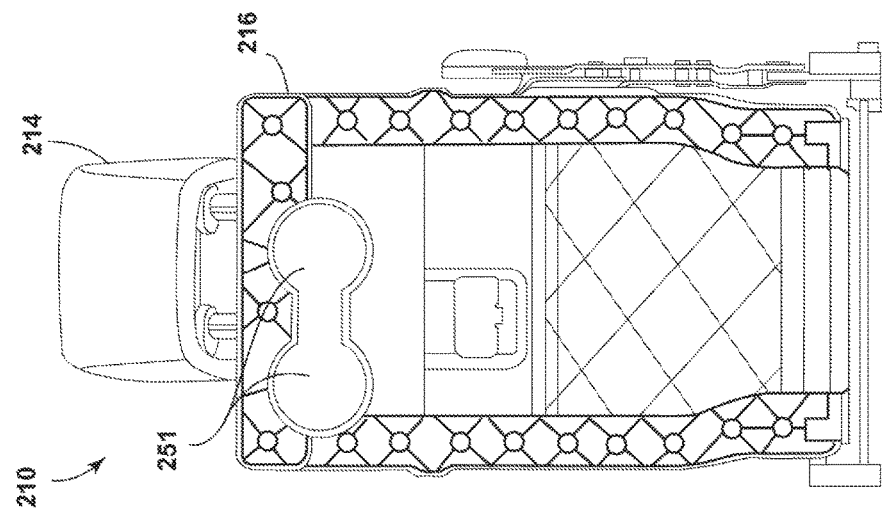
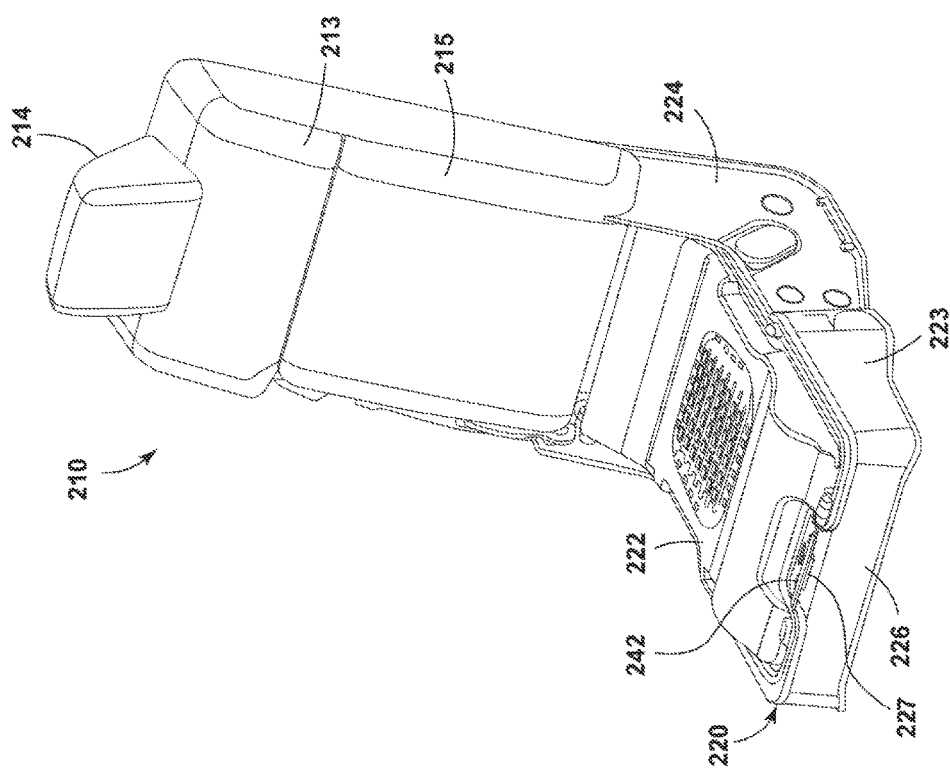
FIG. 20
FIG. 21

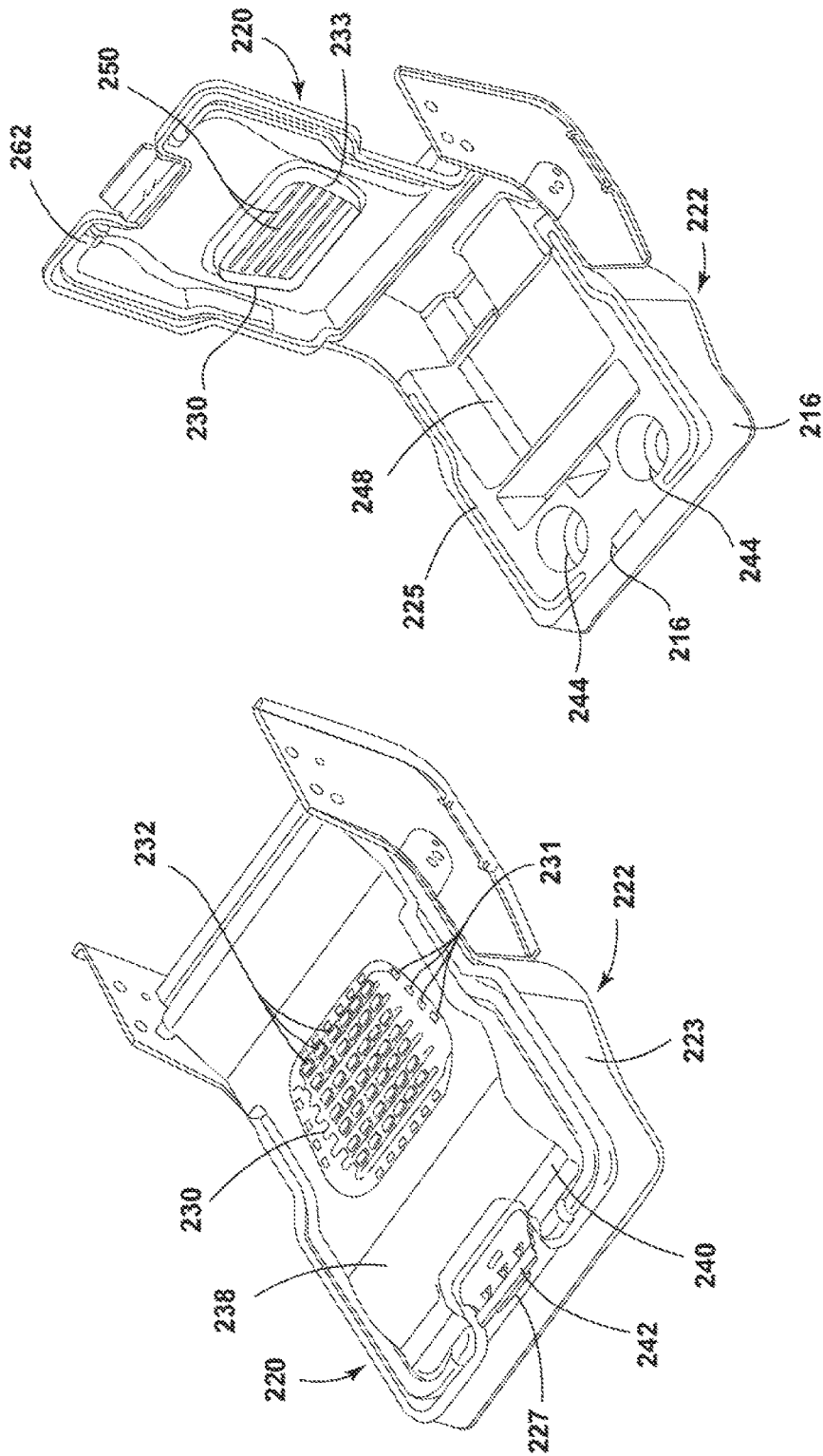

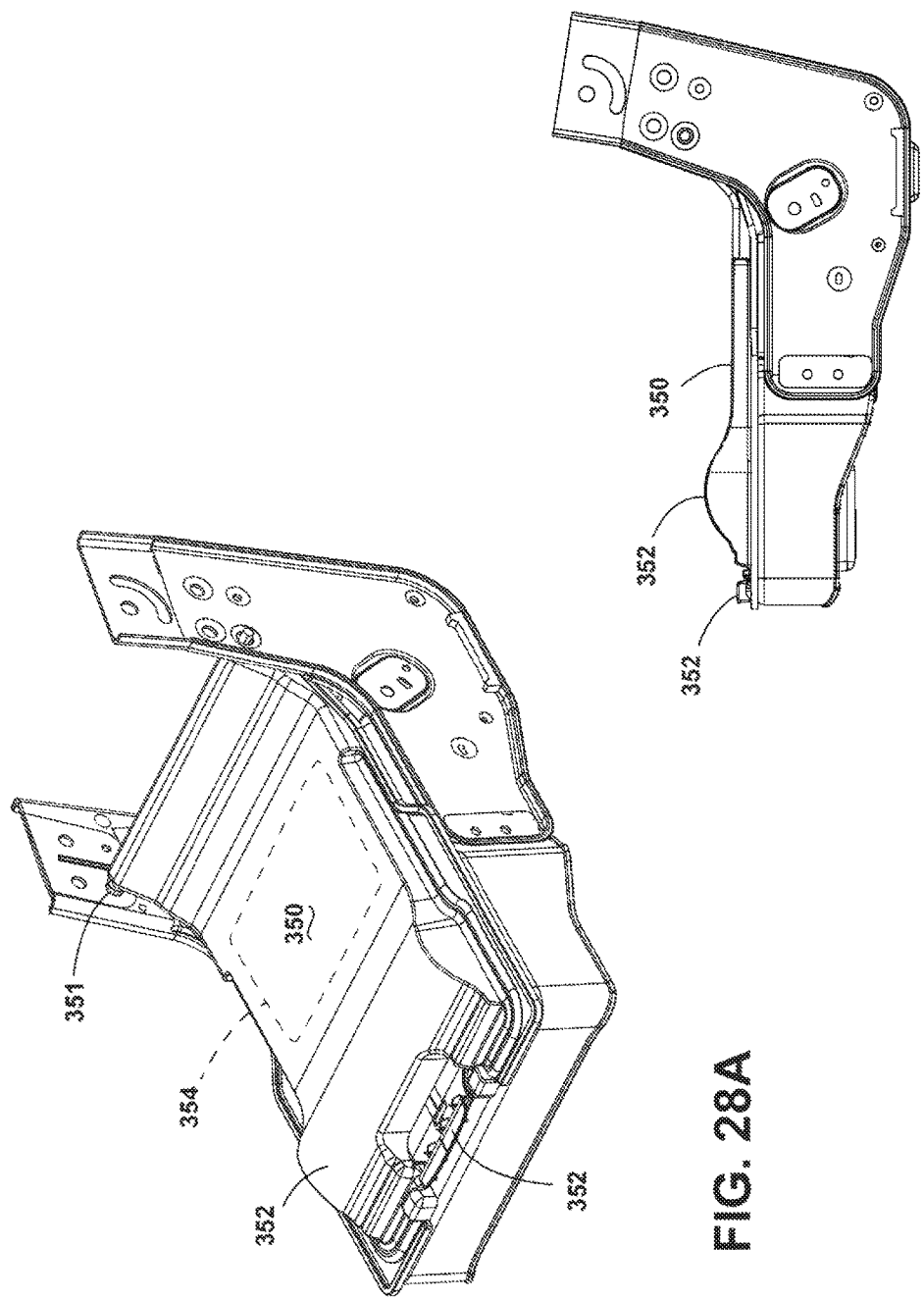

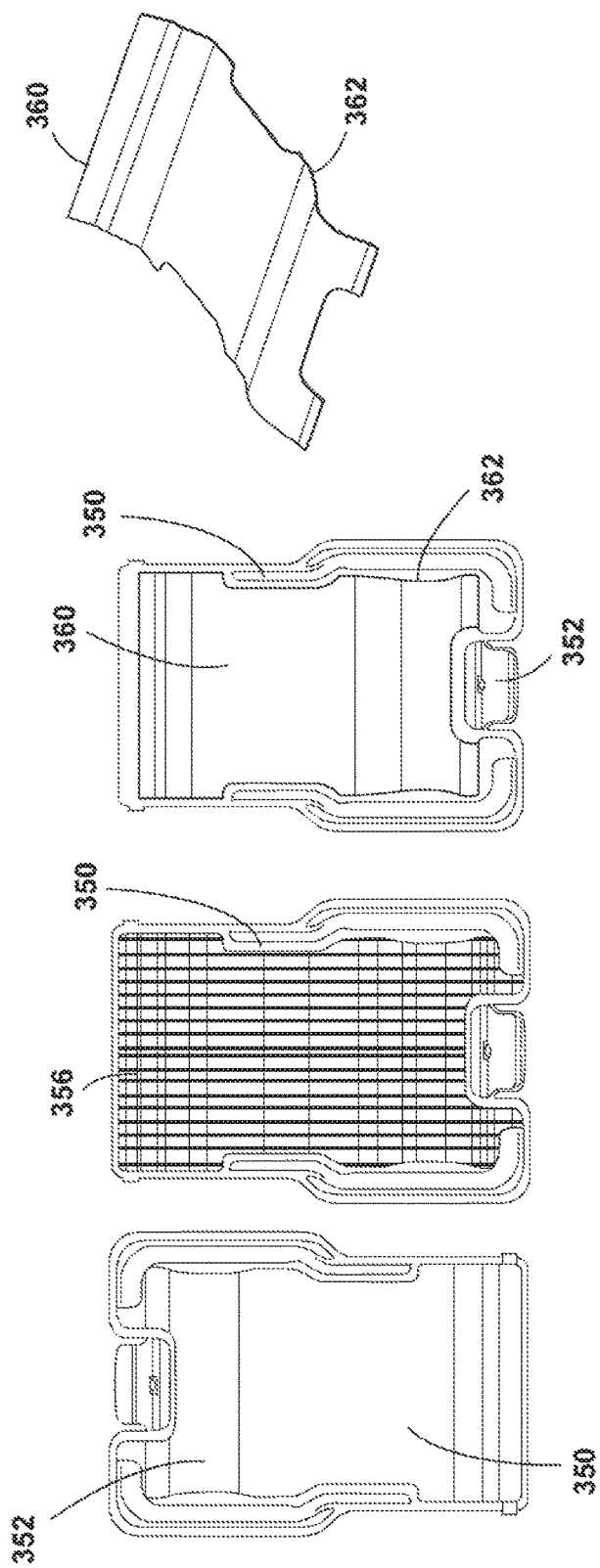

SEAT CUSHION PAN ASSEMBLY

CROSS-REFERENCE TO RELATED APPLICATION

This application is a continuation of and claims priority to U.S. patent application Ser. No. 13/932,427, filed on Jul. 1, 2013, now U.S. Pat. No. 9,340,162, entitled "SEAT CUSHION PAN ASSEMBLY," the entire disclosure of which is hereby incorporated herein by reference.

FIELD OF THE INVENTION

The present invention generally relates to a vehicle seating assembly, and more particularly to a seat cushion pan assembly for a vehicle seating assembly.

BACKGROUND OF THE INVENTION

The general construction of the vehicle seating assembly of the present invention is designed to be lightweight and thin, yet rigid, to provide support to a passenger during both regular use and in the event of a collision. The lightweight material also provides a flexible resilient layer to the vehicle seating assembly to increase the overall comfort of a passenger.

SUMMARY OF THE INVENTION

One aspect of the present invention includes a vehicle seating assembly having a seat back including a polymeric body portion defining a support frame having a plurality of forwardly extending connection pins disposed about a periphery of a forward surface of the support frame. A flexible comfort carrier is disposed over a front surface of the polymeric body portion and includes a multitude of openings defining a support matrix configured to support the weight of a passenger. The body portion includes a plurality of slots configured to receive and engage the plurality of forwardly extending connection pins. A cushion layer extends over the flexible comfort carrier. A head restraint extends upwardly from the forward support frame.

Another aspect of the present invention includes a vehicle seating assembly having a seat back including a polymeric body portion that has cupholders and a storage bin on a backside thereof, and that defines a support frame with substantially linear vertically-extending side portions and a plurality of forwardly extending connection pins disposed about a periphery of a forward surface of the support frame. A flexible comfort carrier is disposed over a front surface of the polymeric body portion and includes a multitude of openings defining a support matrix configured to support the weight of a passenger. The polymeric body portion includes a plurality of slots configured to receive and engage the plurality of forwardly extending connection pins.

Yet another aspect of the present invention includes a vehicle seating assembly having a seat back including a polymeric body portion defining a forward support frame having a plurality of forwardly extending connection pins. A flexible comfort carrier is disposed over a front surface of the polymeric body portion and includes a multitude of openings defining a support matrix. The flexible comfort carrier includes a plurality of keyhole slots configured to receive the plurality of forwardly extending connection pins.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a side perspective view of one embodiment of a flexible comfort carrier of the present invention;

FIG. 8 is a side perspective view of one embodiment of a cushion layer of the present invention;

FIG. 20 is a top perspective view of another embodiment of a vehicle seating assembly of the present invention;

FIG. 21 is a rear elevational view of the seating assembly of FIG. 20;

FIG. 22 is a top perspective view of one embodiment of a seat of the vehicle seating assembly of FIG. 20;

FIG. 23 is a top perspective view of the seat of FIG. 22 with the seat pan in an open position;

FIG. 28A is a top perspective view of yet another embodiment of a seat and a seat pan for use with the vehicle seating assembly of the present invention;

FIG. 28B is a side elevational view of the seat of FIG. 28A;

FIG. 29 is a top plan view of the seat pan illustrated in the seat of FIG. 28A;

FIG. 30 is a bottom plan view of the seat pan of FIG. 29;

FIG. 31 is a bottom plan view of the seat pan of FIG. 30 with a reinforcement support added thereto;

FIG. 32 is a top perspective view of the reinforcement support of FIG. 31;

DETAILED DESCRIPTION OF THE EMBODIMENTS

Figure 1:
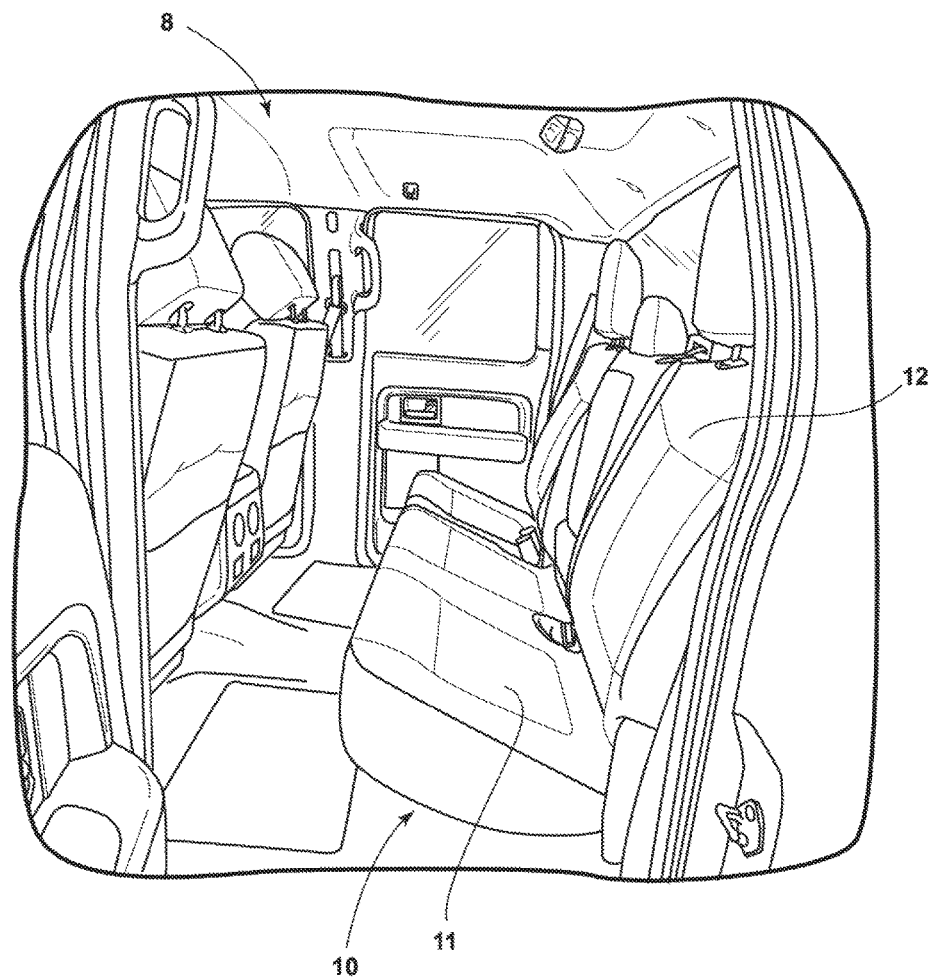
FIG. 1 is a top perspective view of a vehicle that includes one embodiment of a vehicle seating assembly of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
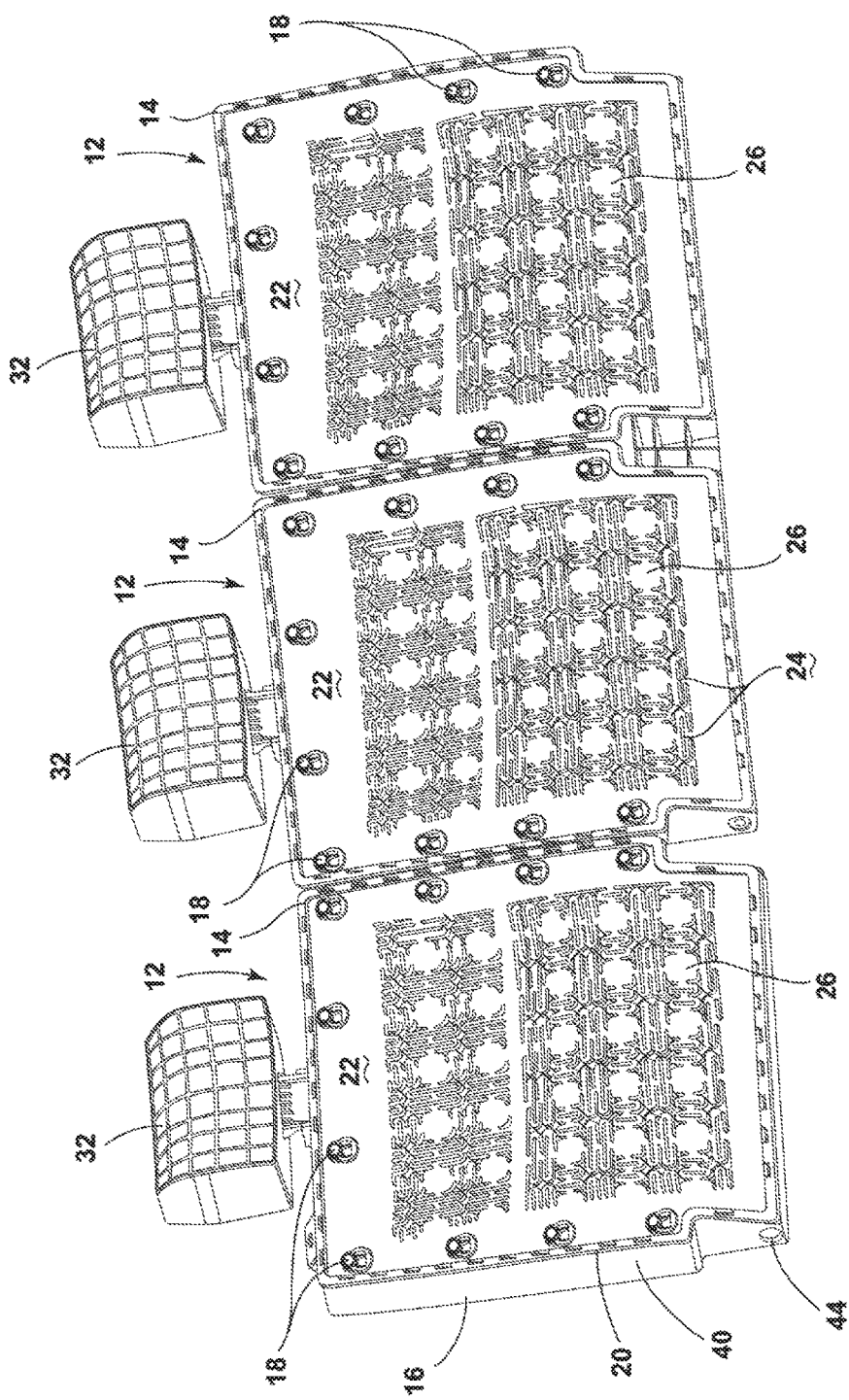
FIG. 2 is a top perspective view of one embodiment of a portion of a plurality of seat backs of the present invention.
Figure 6:
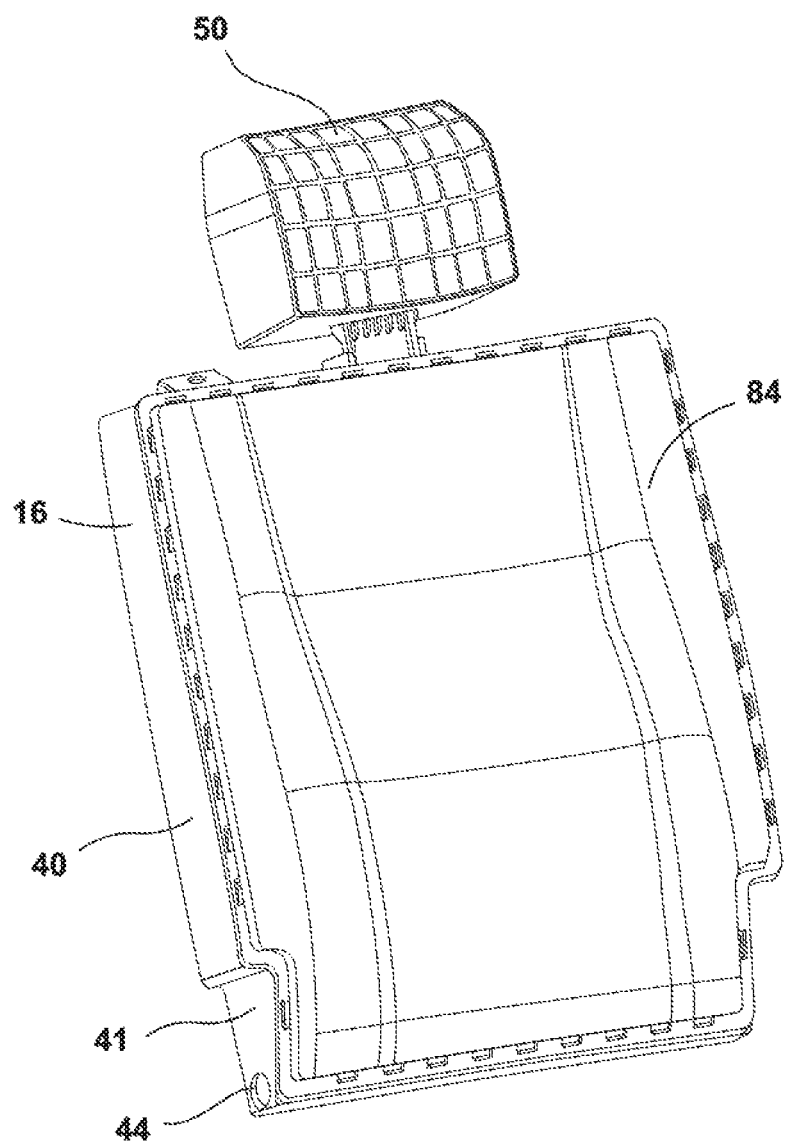
FIG. 6 is a top perspective view of one embodiment of a vehicle seat back with a comfort carrier and a cushion material extending over the vehicle seat back.

Referring to FIGS. 1, 2, and 6, reference numeral 8 generally designates a vehicle having a vehicle seating assembly 10 including a seat 11, as well as a seat back 12 having a polymeric body portion 14, which defines a support frame 16 having a plurality of forwardly extending connection pins 18 disposed about a periphery of a forward surface 20 of the support frame 16. A flexible comfort carrier 22 is disposed over the forward surface 20 of the support frame 16. The flexible comfort carrier 22 includes a multitude of openings 24, which define a support matrix 26 configured to support the weight of a passenger. The flexible comfort carrier 22 includes a plurality of slots 28 configured to receive and engage the plurality of forwardly extending connection pins 18. A cushion layer 30 extends over the flexible comfort carrier 22. A head restraint 32 extends upwardly from the support frame 16.

Figure 3B:
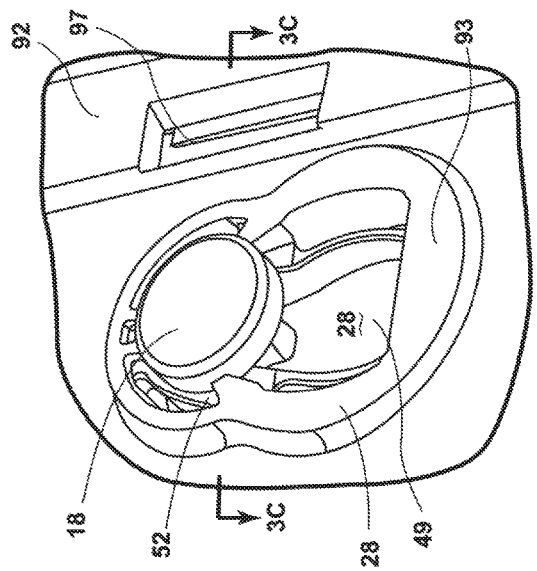
FIG. 3B is an enlarged bottom perspective view of a connection pin engaged with an engagement slot.
Figure 3C:
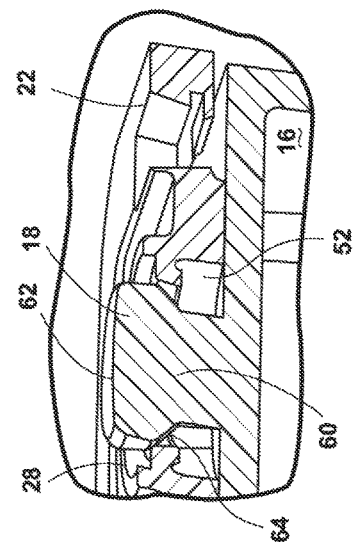
FIG. 3C is an enlarged side cross-sectional view taken at line 2C-2C of FIG. 2.
Figure 3A:
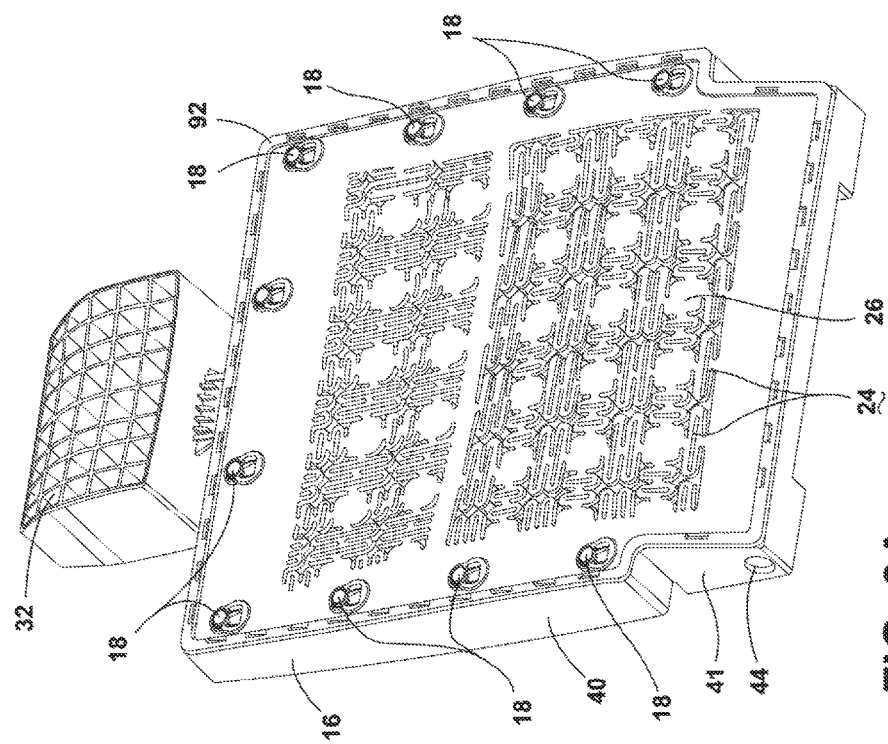
FIG. 3A is a bottom perspective view of one embodiment of a vehicle seat back of the present invention.

Referring now to FIGS. 2 and 3A, the illustrated vehicle seating assembly 10 includes substantially linear vertically-extending side portions 40 configured for abutment with an adjacent vehicle seating assembly 10 (FIG. 2). Notably, the plurality of slots 28 are generally linearly aligned on each of the side portions 40, as well as a top portion of the seat back 12. The seat back 12 includes cutouts 41 at a lower portion thereof for connection with a hinge assembly that extends upwardly from the seat 11 of the vehicle seating assembly 10. As noted in FIG. 3A, pivot apertures 44 are located in the cutouts 41 and are configured to engage pivot knobs 46, such as that shown in FIG. 14, thereby allowing the seat back 12 to rotate relative to the seat 11. The seat back 12 is also configured to accommodate various head restraints 32, such as a fixed head restraint 48 (FIGS. 12 and 13), or a movable head restraint 50, as illustrated in FIG. 3A. The versatility of the movable head restraint 50 will be discussed in further detail below.

Referring now to FIGS. 3B and 3C, the plurality of slots 28 generally define key hole slots having a widened portion 49 and a narrowed portion 52. The forwardly extending connection pins 18 are configured to engage the widened portion 49 of the slots 28 and slide into the narrowed portion 52 of the slots 28 where the forwardly extending connecting pins 18 are retained. The engagement of the forwardly extending connection pins 18 with the key hole slots 28 maintains the flexible comfort carrier 22 in position on the support frame 16. The forwardly extending connection pins 18 include a neck 60 with a head 62 extending therefrom. An angled wall 64 transitions the neck 60 to the head 62. During assembly, a manufacturer would position the flexible comfort carrier 22 next to the seat back 12 and align the widened portion 49 of the key hole slots 28 with the forwardly extending connection pins 18. The manufacturer would insert the forwardly extending connection pins 18 into the widened portion 49 and push the flexible comfort carrier 22 downward, thereby forcing the forwardly extending connection pins 18 into secure engagement with the narrowed portion 52 of the key hole slots 28. The flexible comfort carrier 22 would then be installed. Features such as those disclosed in U.S. patent application Ser. No. 13/749,584, entitled "QUICK-CONNECT TRIM CARRIER ATTACHMENT," filed on Jan. 24, 2013, now U.S. Pat. No. 9,216,677, which is hereby incorporated herein by reference in its entirety, may also be implemented.

Figure 5:
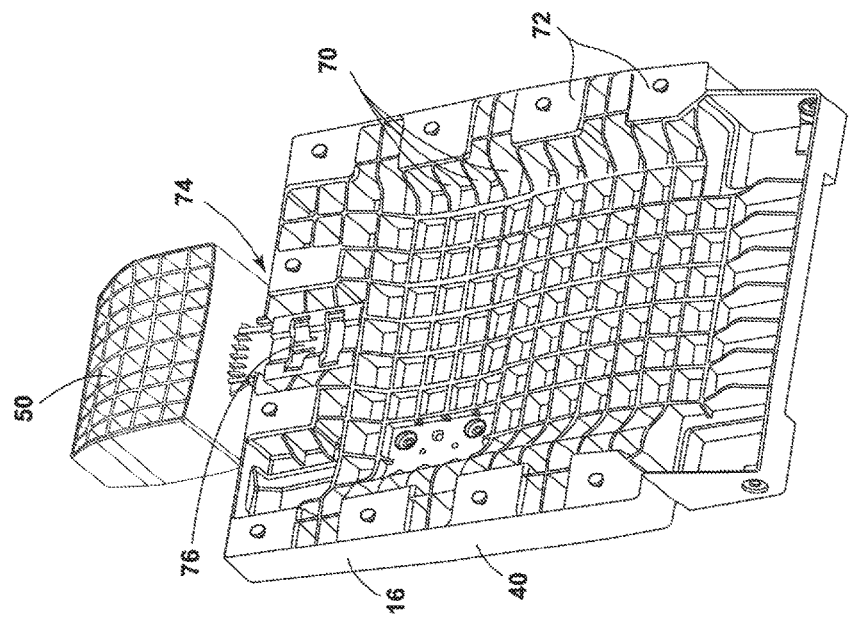
FIG. 5 is a bottom perspective view of one embodiment of a vehicle seat back with a movable head restraint.
Figure 4:
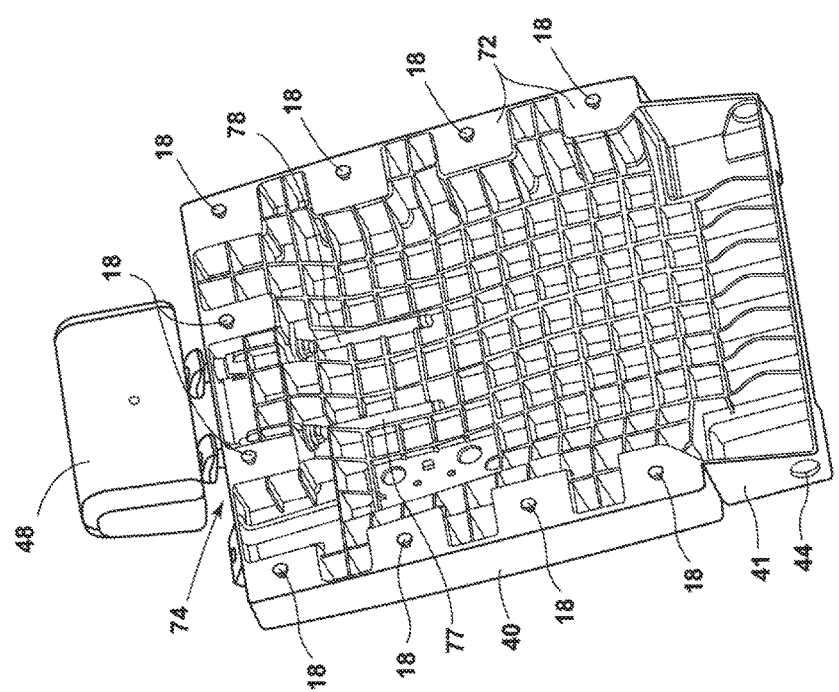
FIG. 4 is a side perspective view of one embodiment of a vehicle seat back with a static head restraint.

Referring now to FIGS. 4 and 5, the support frame 16 includes a number of forwardly extending support flanges 70 that run both vertically and horizontally that provide structural rigidity and overall strength to the support frame 16. An outer periphery of the support frame 16 includes a number of planar portions 72 from which the forwardly extending connection pins 18 extend. The forwardly extending connection pins 18 and the planar portions 72 are equidistantly spaced about the periphery in the illustrated embodiment. A top portion of the seat 11 includes a head restraint receiving assembly 74 that is configured to receive a support post 76 from the movable head restraint 50 (FIG. 5) or configured to receive first and second cylindrical support posts 77, 78 of the fixed head restraint 48. The general construction of the support frame 16, and specifically the polymeric body portion 14 of the support frame 16, is designed to be lightweight and thin, yet exceptionally strong to support a passenger during both regular use and in the event of a collision. An intermediate portion of the support frame 16 includes a recessed area contoured to the shape of the back of a passenger. A lower area of the intermediate portion may arc outwardly to support the lower lumbar region of the back of a passenger.

Referring now to FIGS. 6-9, the general construction of the vehicle seating assembly 10 includes the seat back 12, which is connected to the flexible comfort carrier 22 via the interface of the key hole slots 28 and the forwardly extending connection pins 18. The cushion layer 30 extends over the flexible comfort carrier 22 and may include an open or closed foam material 84 that is secured over the flexible comfort carrier 22. The foam material 84 is lightweight and provides another flexibly resilient layer to the seat 11 to increase the overall comfort of the vehicle seating assembly 10. After the foam material 84 is installed, a coverstock is secured over the foam material 84 to generally protect the foam material 84 and the seat back 12.

The flexible comfort carrier 22, as illustrated in FIG. 8, is generally constructed from a flexible polymer. In the illustrated embodiment, the multitude of openings 24 that define the support matrix 26 are provided in varying arrays of vertical and horizontal hoops 90 that are generally linear in configuration. The horizontal hoops 90 may extend in a vertical direction or a horizontal direction. The construction of the flexible comfort carrier 22 allows the hoops 90 to expand and retract, depending on the shape and size of a passenger, as well as dynamic loading placed on the flexible comfort carrier 22 during regular use and during a collision event. In addition, reinforcement rings 93 are provided that surround each slot 28 to provide reinforcing support to the flexible comfort carrier 22. A periphery 95 of the flexible comfort carrier 22 includes a reinforced portion 92 that includes a plurality of coverstock engagement holes 97 configured to receive and secure engagement fasteners on the coverstock.

Figure 9:
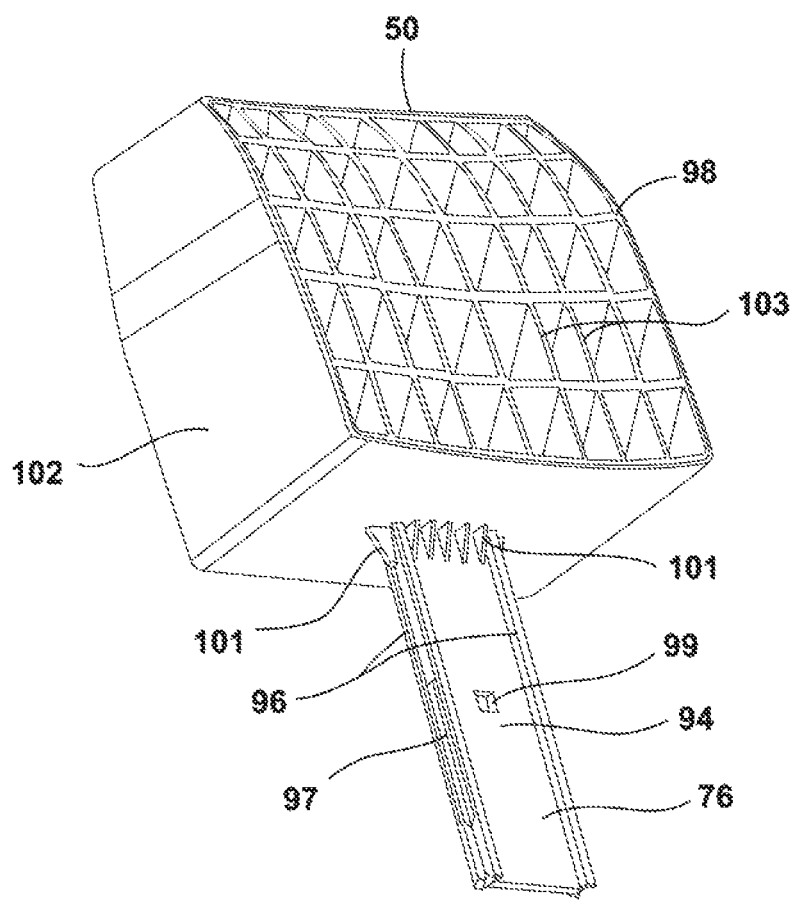
FIG. 9 is a bottom perspective view of one embodiment of a movable head restraint.
Figure 10:
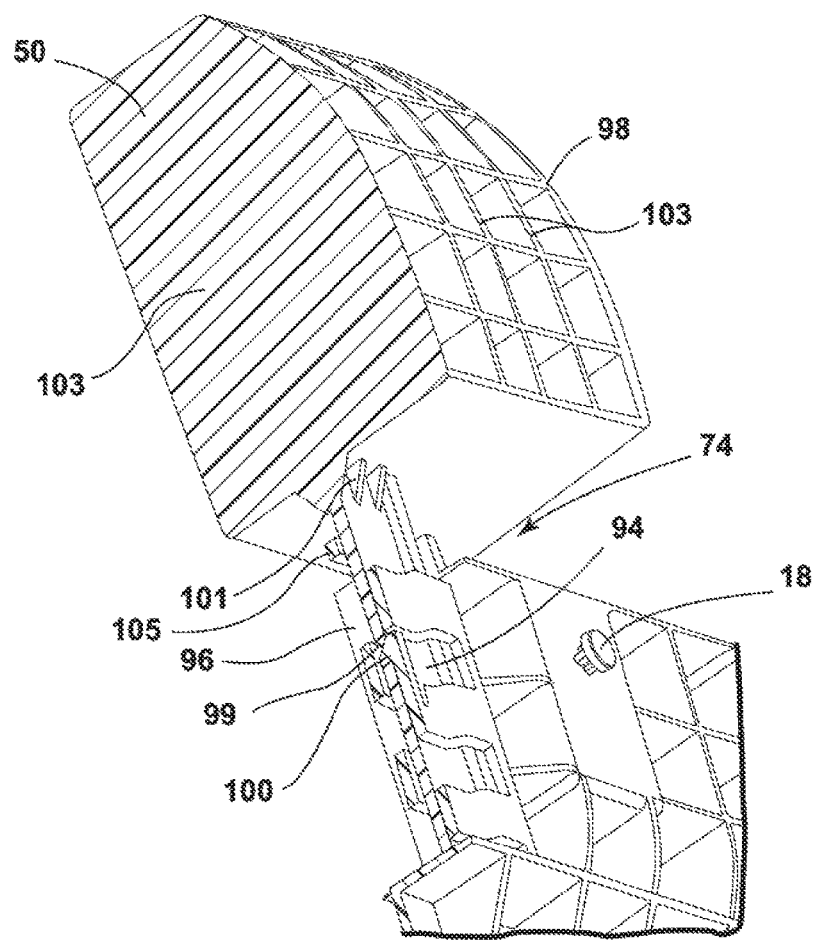
FIG. 10 is a bottom perspective cross-sectional view taken of a movable head restraint installed in a support frame and in a use position.
Figure 11:
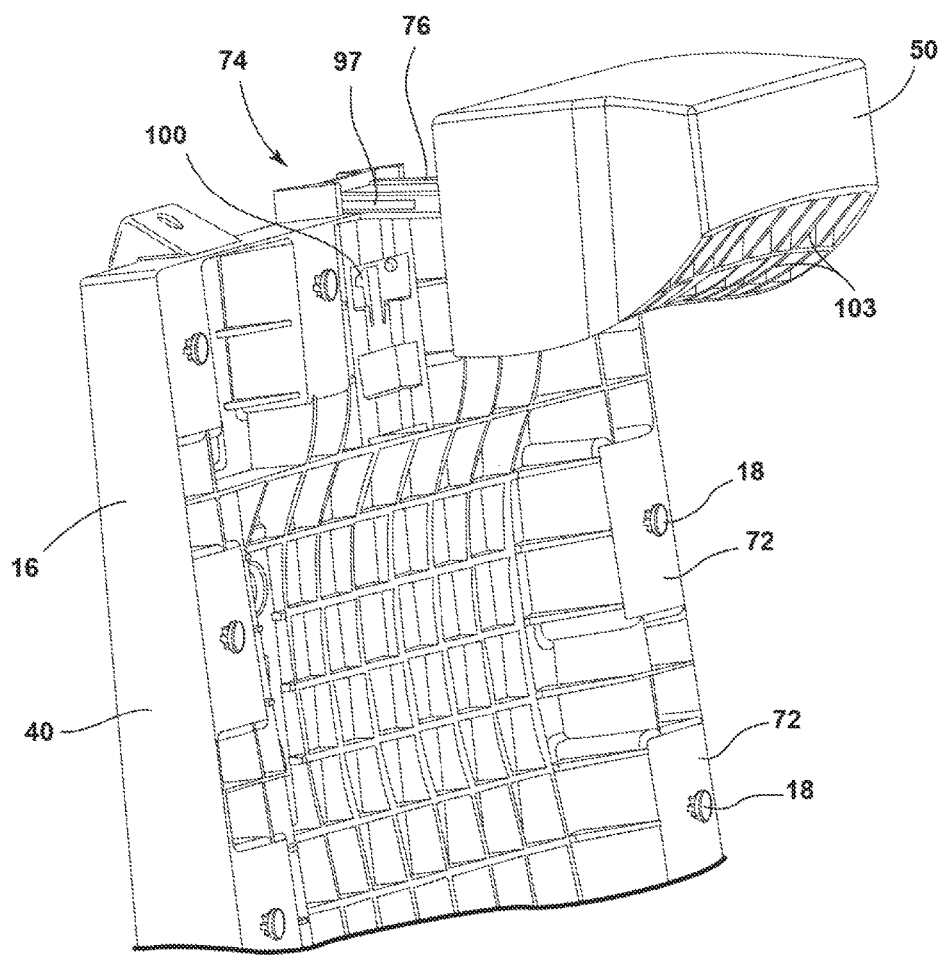
FIG. 11 is a side perspective view of a vehicle seating assembly of the present invention with the head restraint rotated forward to a storage position.

Referring now to FIGS. 9-11, the movable head restraint 50 is generally configured to extend into the head restraint receiving assembly 74 and the support frame 16. The support post 76 of the movable head restraint 50 has a generally planar construction and includes a blade configuration having an intermediate planar portion 94, as well as side portions 96 that define the coverstock engagement holes 97 configured to interface with the head restraint receiving assembly 74 of the support frame 16. The coverstock engagement holes 97 help guide the support post 76 between the use position (FIGS. 2 and 10), as well as the stored position (FIG. 11). A stop may be provided on a bottom portion 93 of the support post 76. The movable head restraint 50 includes a headrest 98 that is supported on the post 76. The attachment of the post 76 with the headrest 98 is reinforced by flanges 101. The flanges 101 taper from the movable head restraint 50 to the support post 76. The headrest 98 has planar side members 102. The internal area of the headrest 98 includes a multitude of vertical and horizontal reinforcing members 103. A top portion of the headrest 98 may taper such that a bottom portion of the headrest 98 is wider than a top portion. The intermediate planar portion 94 includes an aperture 99 configured to receive a retaining hook 100 (FIG. 10). Thus, the movable head restraint 50 can be inserted into the support frame 16 until the retaining hook 100 engages the aperture 99. When the retaining hook 100 engages the aperture 99, the movable head restraint 50 is held in secure relation to the support frame 16. To remove the movable head restraint 50, the movable head restraint 50 is pushed downward, which forces the retaining hook 100 out of engagement with the aperture 99. The movable head restraint 50 can then be withdrawn and rotated forward, as illustrated in FIG. 11. It is generally contemplated that a push-push mechanism, as understood by a person having ordinary skill in the art could be used to both engage and disengage the movable head restraint 50 for the seat back 12. Alternatively, the retaining hook 100 may be permanently secured with the aperture 99 and released only by a special tool. In the illustrated embodiment, the movable head restraint 50 can be tilted forward to 94 degrees relative to the seat back 12. When the head restraint 32 is in the forward stored position, the seat back 12 can be rotated forward to a downward position without interfering with the seat back 12 from a front seat in the vehicle cabin. In one embodiment, the movable head restraint 50 is lifted up until a bottom portion of the post 76 is proximate an abutment member 105 (FIG. 10). The movable head restraint 50 can then be rotated approximately 94 degrees until the post 76 abuts the abutment member 105. Alternatively, the seat back 12 can be maintained in the upright position and provide increased visibility rearward for passengers and the driver in the front seat of the vehicle cabin. The support post 76 is configured to be substantially withdrawn from the seat back 12 before moving from the use position to the storage position.

Figure 13:
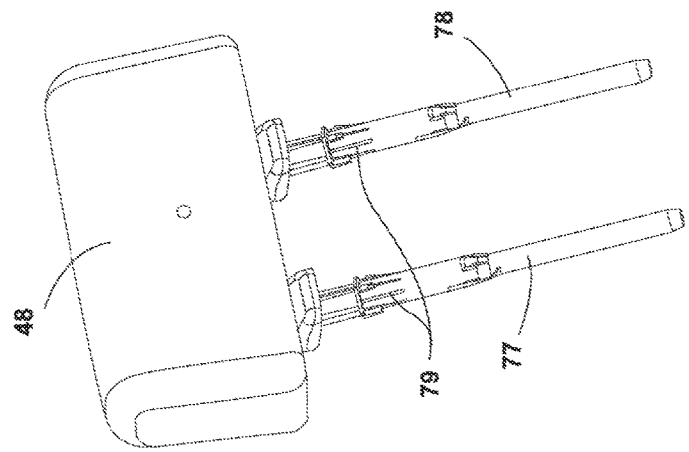
FIG. 13 is a top perspective view of a fixed head restraint for use with a vehicle seating assembly of the present invention.
Figure 12:
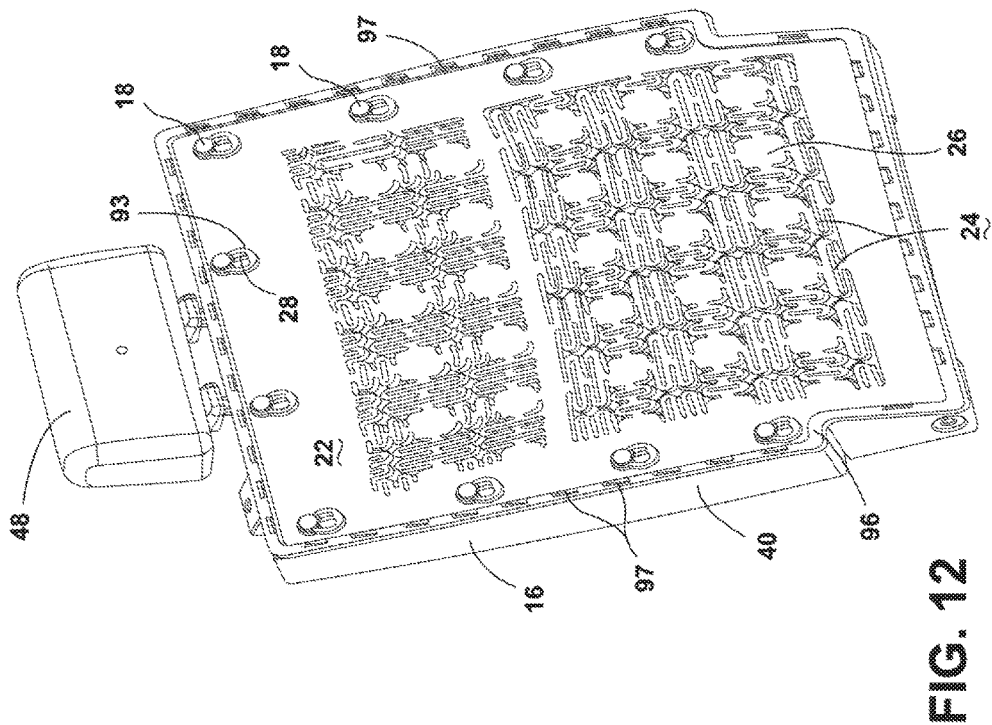
FIG. 12 is a top perspective view of another embodiment of a vehicle seating assembly incorporating a fixed head restraint.
Figure 14:
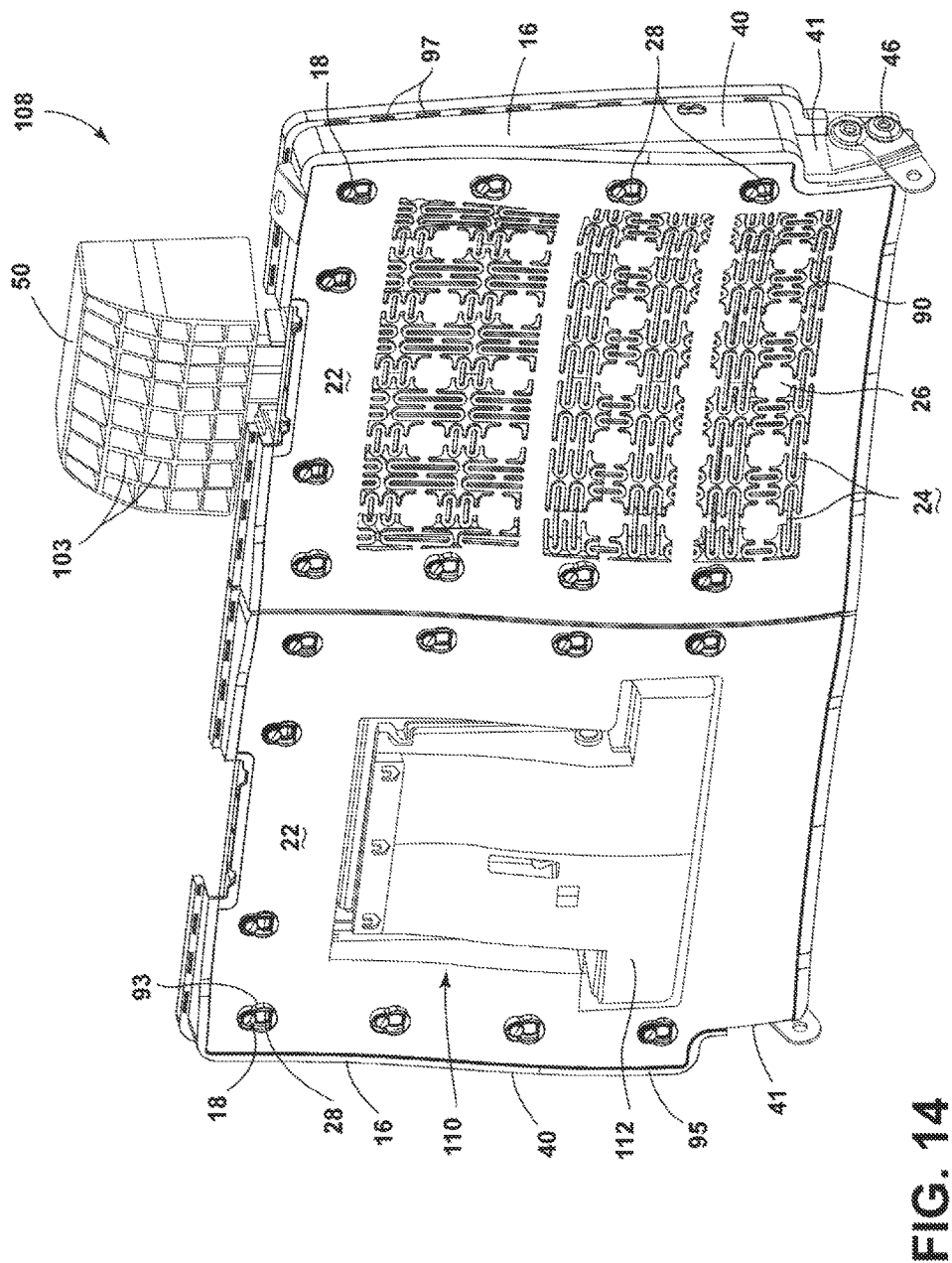
FIG. 14 is a top perspective view of one embodiment of a vehicle seating assembly with a cupholder assembly.
Figure 15:
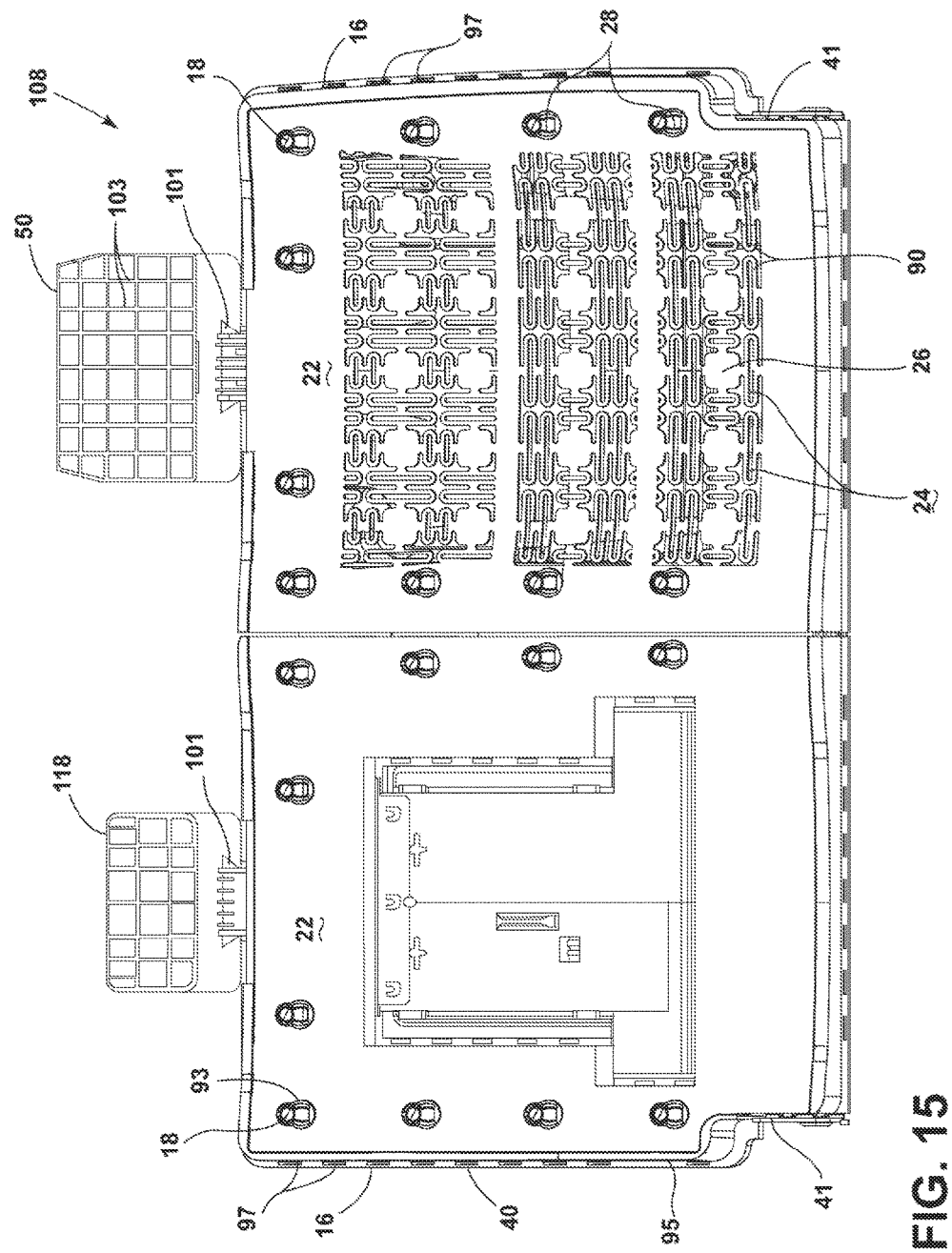
FIG. 15 is a front elevational view of the vehicle seating assembly of FIG. 14.

Referring now to FIGS. 12 and 13, the fixed head restraint 48 is designed to engage the support frame 16 and maintain a fixed position relative to the support frame 16 during use. However, it is contemplated that the fixed head restraint 48 could be removed in the event repair or replacement is necessary in relation to the fixed head restraint 48. Additionally, to accommodate the first and second cylindrical support posts 77, 78 that extend downwardly from the fixed head restraint 48, the seat back 12 includes a different head restraint receiving assembly 74 designed to accommodate the first and second cylindrical support posts 77, 78. The vehicle seating assembly 10 is otherwise similar to the embodiment disclosed with reference to FIGS. 2-5 and 7-9. The head restraint receiving assembly 74 includes two post receivers configured to lockingly engage latches 79 on the posts 77, 78, thereby maintaining the fixed head restraint 48 in fixed relation to the vehicle seating assembly 10.

Referring now to FIGS. 14-19, the illustrated vehicle seating assembly 108 includes a cupholder assembly 110 having a general T-shaped configuration. A base portion 112 of the cupholder assembly 110 is rotatably coupled with the seat back 12. Accordingly, the cupholder assembly 110 can be rotated vertically about a horizontal axis between deployed and non-deployed positions. When in the non-deployed position, the cupholder assembly 110 is generally flush with a forward surface of a trim cover of the seat back 12. When in the deployed position, the cupholder assembly 110 extends forward relative to the seat back 12 and first and second cupholders 114, 115 deploy and are ready for use by a passenger.

Figure 16:
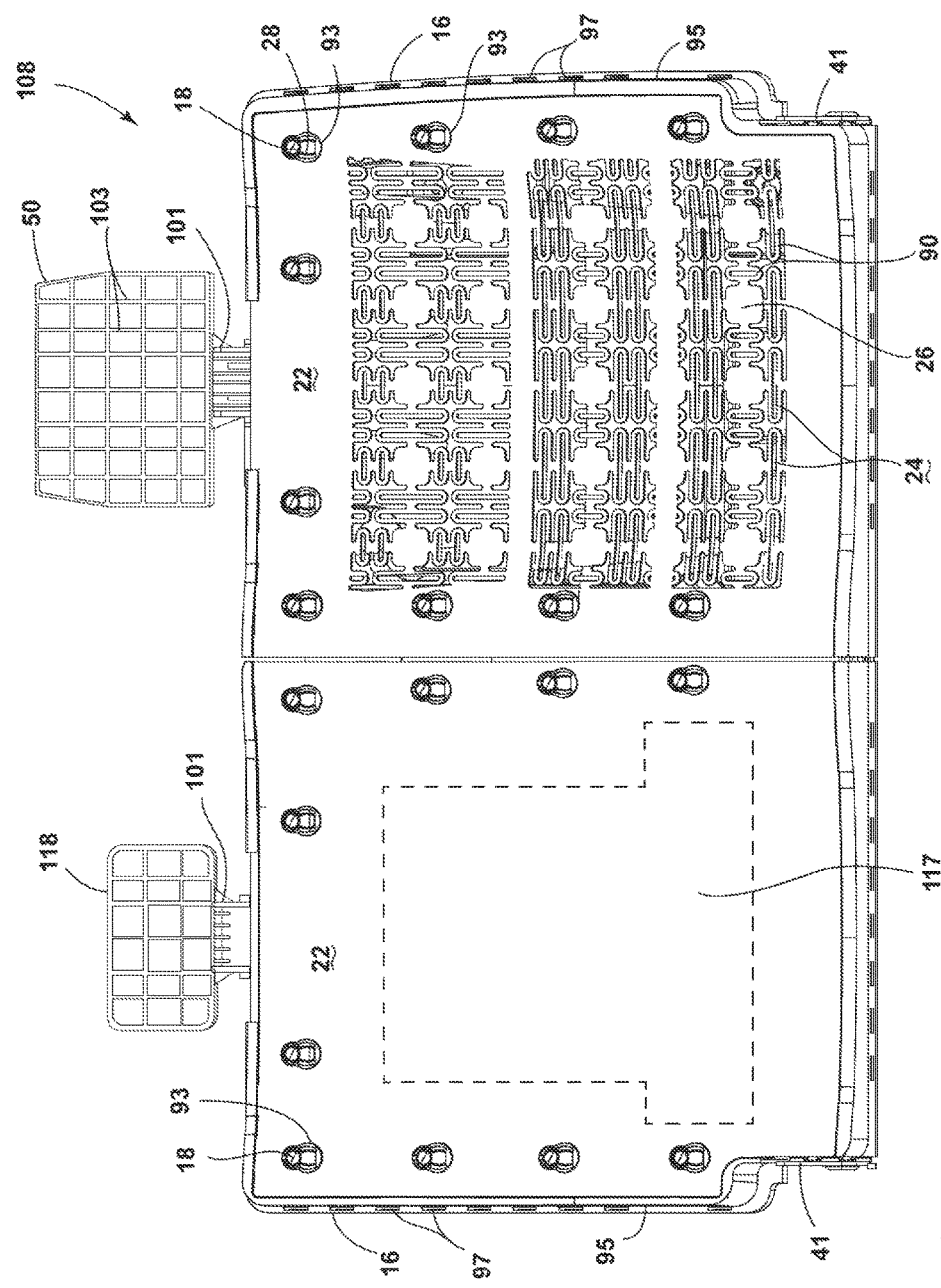
FIG. 16 is a front elevational view of the vehicle assembly of FIG. 14 with the cupholder assembly removed.
Figure 17:
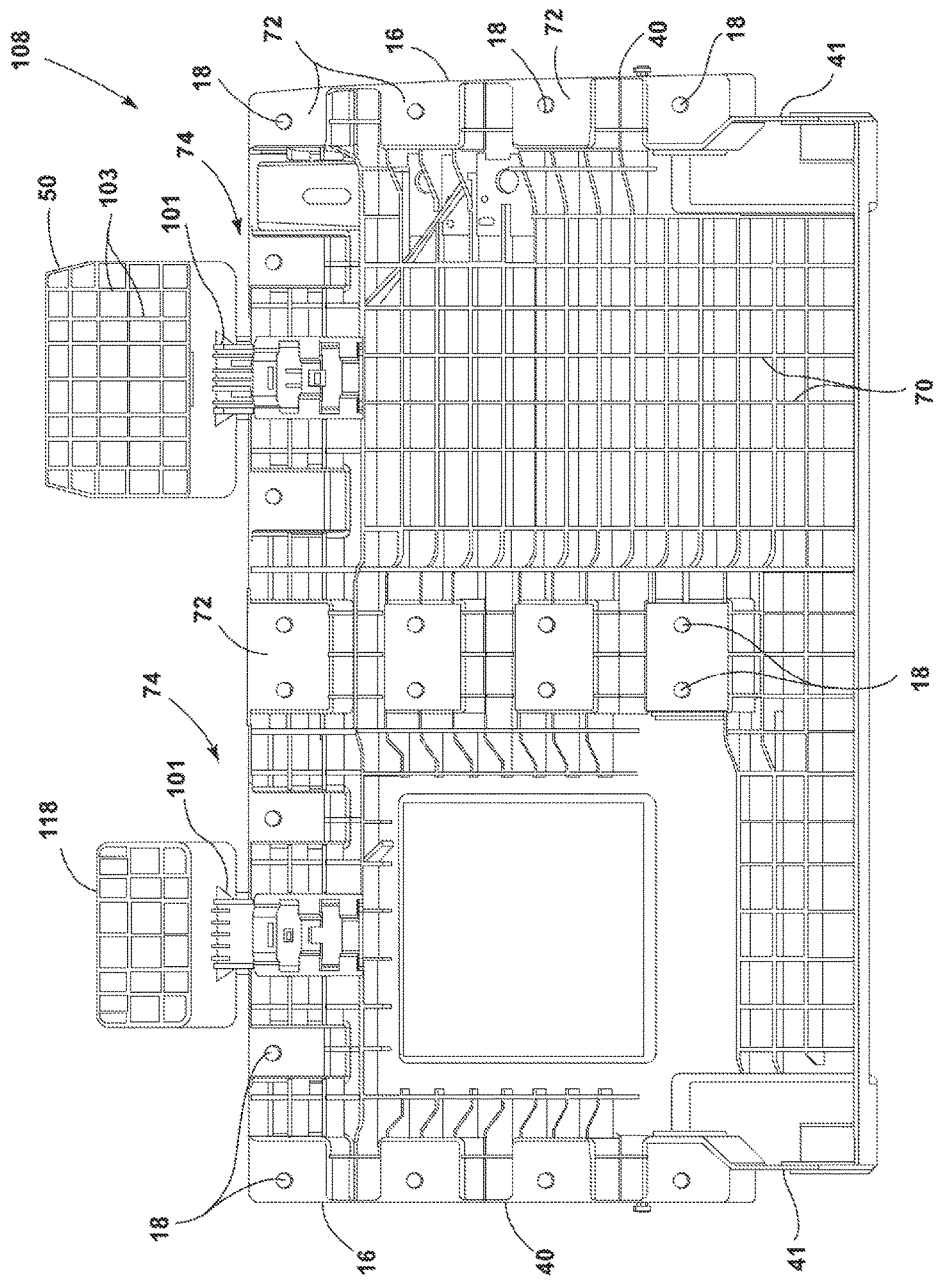
FIG. 17 is a front elevational view of the vehicle seating assembly of FIG. 14 with the cupholder assembly and flexible comfort carrier removed.

With reference to FIG. 16, if the cupholder assembly 110 is not installed, the flexible comfort carrier 22 may simply include a solid polymeric portion 117. Notably, the vehicle seating assembly 108 having the cupholder assembly 110 includes a small head restraint 118. It is contemplated that the small head restraint 118 may be movable or fixed, depending on the desired use of the vehicle seating assembly 108. The small head restraint 118 provides a lower height to the vehicle seating assembly 108, generally thereby increasing the rearward view of a passenger in a front portion of the vehicle cabin. As shown in FIG. 17, the seat backs 12 may include shared planar portions 72. Other features of the vehicle seating assembly 108 are similar to features previously disclosed in relation to other embodiments.

Figure 19:
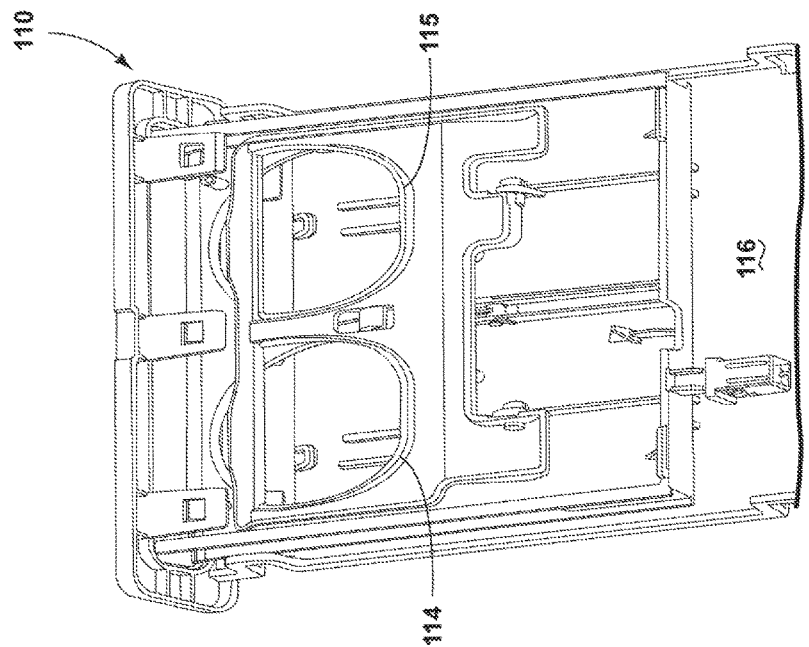
FIG. 19 is an enlarged side perspective view of the cupholder assembly of FIG. 18 with a latching device secured thereto.
Figure 18:
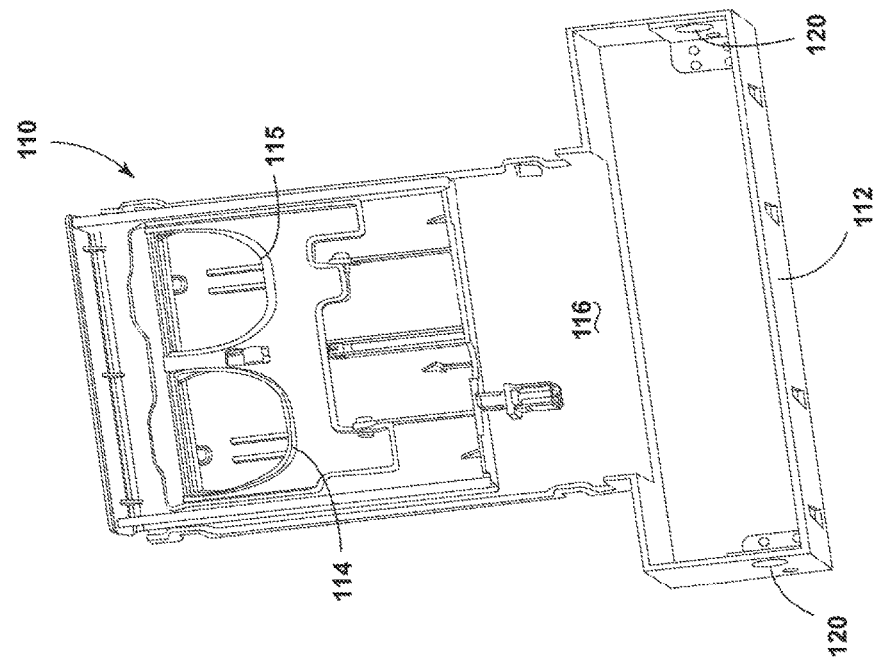
FIG. 18 is a side perspective view of a cupholder assembly of the present invention.

Referring now to FIGS. 18 and 19, the cupholder assembly 110 may include different configurations. As illustrated in FIGS. 18 and 19, the base portion 112 of the cupholder assembly 110 includes apertures configured to engage pivot knobs 46 in the seat back 12. The cupholder assembly 110 can be rotated forward, as noted above, and the cupholders 114, 115 can be deployed, such that cups carrying a beverage can be inserted into the openings defined by the cupholders 114, 115. The cupholder assembly 110 includes an inner support 116 that provides support to the cupholder assembly 110. The cupholder assembly 110 is configured to be rotated between deployed and non-deployed positions by rotation of the cupholder assembly 110 about pivot apertures 120.

Referring now to FIGS. 20-23, another embodiment of the present invention includes a narrow vehicle seating assembly 210. In the illustrated embodiment, the narrow vehicle seating assembly 10 is a 20 percent seat, meaning that the vehicle seating assembly 10 is not a full-size seat and is generally configured to be positioned between two 40 percent seats in the vehicle cabin. The vehicle seating assembly 210 includes a seat back 212 having upper and lower portions 213, 215 supported on a frame 216, as well as a headrest 214. The vehicle seating assembly 210 also includes a seat 220 with a seat pan 222 extending over the seat 220. The seat 220 is supported on a frame assembly 223. An upturned portion 224 of the frame assembly 223 is pivotally coupled with the seat back 212. A forward portion 226 of the frame assembly 223 supports a base portion 225 that engages the seat pan 222.

The seat pan 222 is movable between a closed position (FIG. 22) and an open position (FIG. 23). The seat pan 222 includes an intermediate flex portion 230, which flexes under the weight of a passenger, thereby providing additional comfort to a passenger. The intermediate flex portion 230 is centrally disposed in the seat pan 222 and may be made of a similar or different material than the seat pan 222. In the illustrated embodiment of FIGS. 22 and 23, the intermediate flex portion 230 is wider at a forward end and narrower at a rearward end.

Referring again to FIGS. 20-23, the seat pan 222 also includes an anti-submarine feature in the form of a forward rounded hump 238 that minimizes the likelihood of submarining of the passenger during use. Submarining, for purposes of this disclosure, generally refers to the act of a passenger being forced off the forward edge of the seat under a seatbelt during a forward collision event. The intermediate flex portion 230 includes eyelets 231 configured to engage hooks on the seat pan 222. The intermediate flex portion 230 also includes a multitude of upwardly extending nubs 232 that provide additional grip and flexure to the intermediate flex portion 230. A bottom side of the intermediate flex portion 230 includes a peripheral flange 233. A forward portion 240 of the seat pan 222 includes a latch 242 configured to engage a catch 227 on the support frame 216 of the vehicle seating assembly 210. When the seat pan 222 is in the open position, cupholders 244 are available for use. In addition, a storage compartment 248 behind the cupholders 244 is available to store small items. An underside of the seat pan 222 includes lateral supports 250 designed to provide structural rigidity to the seat pan 222.

Figure 26:
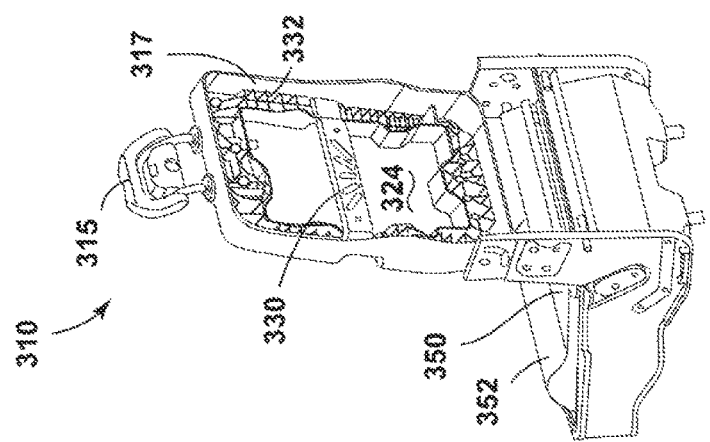
FIG. 26 is a rear perspective view of the vehicle seating assembly of FIG. 24 with the seat back panel removed.
Figure 25:
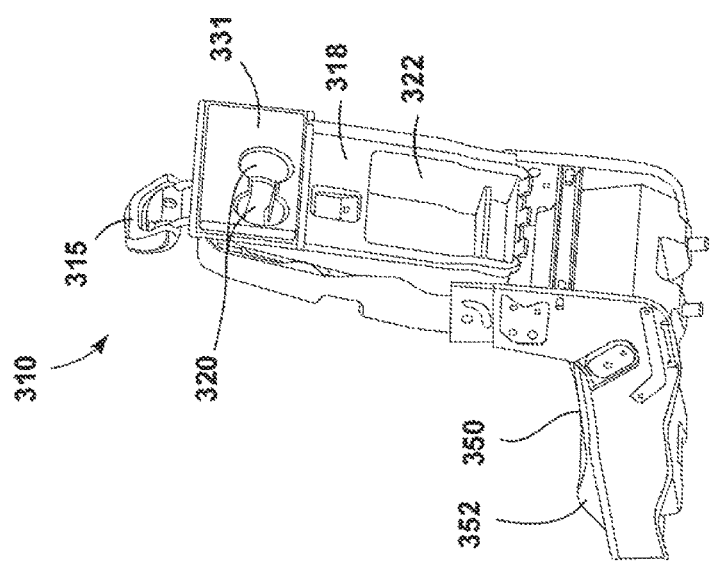
FIG. 25 is a rear perspective view of the vehicle seating assembly of FIG. 24.
Figure 24:
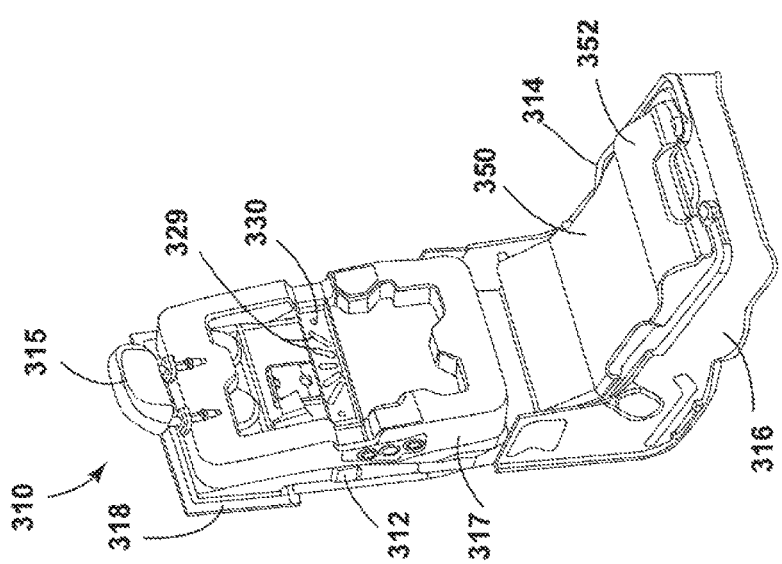
FIG. 24 is a front perspective view of another embodiment of a vehicle seating assembly of the present invention.

Referring now to FIGS. 24-26, yet another embodiment of the present invention includes a vehicle seating assembly 310 having a seat back 312, a seat 314, and a head restraint 315. The seat 314 is supported over a lower frame 316. The lower frame 316 is pivotally coupled with an upper frame 317 that supports the seat back 312. A back panel 318 of the seat back 312 includes cupholders 320, as well as a storage compartment 322. Accordingly, the seat back 312 can be rotated relative to the seat 314, such that the cupholders 320 and the storage compartment 322 are ready for use by passengers. The upper frame 317 defines a cavity 324 into which the cupholders 320 and the storage compartment 322 extend. A flexible support member 330 having slots or indents 329 extends across the upper frame 317 and provides support to a comfort carrier or a cushion assembly. A rear side of the upper frame 317 includes a lattice of structural webbing 332.

Figure 27:
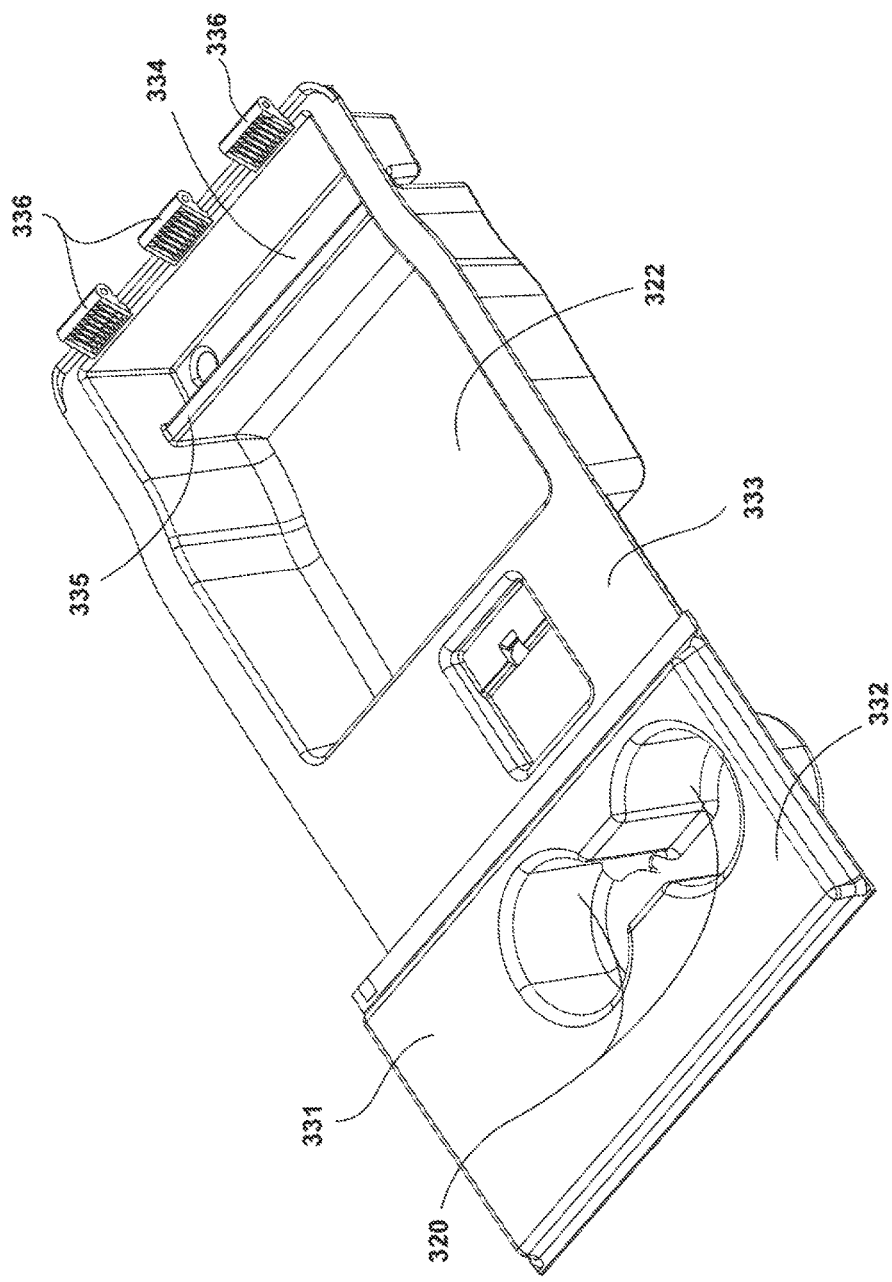
FIG. 27 is a top perspective view of a vehicle seat back panel of FIG. 25.

Referring now to FIG. 27, the vehicle seat back 312 includes a top portion 331 that defines the cupholders 320. A bottom portion 333 includes the storage compartment 322. A second smaller raised compartment 334 is disposed below and behind the storage compartment 322 and separated from the storage compartment 322 by a wall 335. The seat back 312 is rotatable about hinge members 336.

Referring now to FIGS. 28A and 28B, the seat 314 includes a seat pan 350 of the vehicle seating assembly 310 and includes a forward rounded hump 352 designed to minimize the effects of submarining and also to provide a lightweight, yet rigid, solution to the seating comfort of a passenger. The seat pan 350 is rotatable about a rear pivot member 351 between closed and opened positions, such that a storage compartment 354 beneath the seat pan 350 can be accessed. When in the closed position, the seat pan 350 can be held closed via a latching assembly 352. In addition, as shown in FIGS. 29-32, the seat pan 350 may include a lattice of structural supports 356 that provide rigidity to the seat pan 350, and may also include a polymeric or metallic support member 360 that provides yet further support for the seat pan 350. The support member 360 includes a contoured surface 362 that generally follows the contours of the underside of the seat pan 350. In the illustrated embodiment, the support member 360 extends across substantially all of an underside of the seat pan 380.

Figure 35:
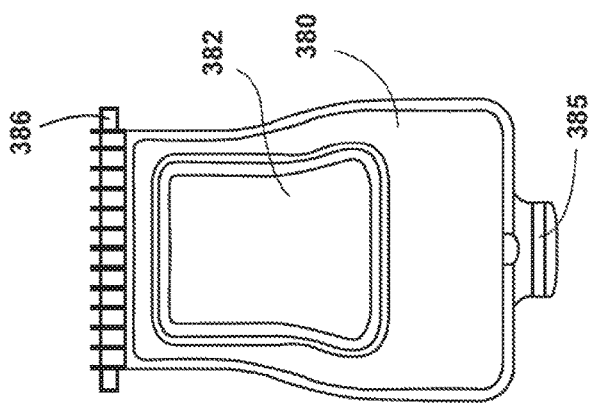
FIG. 35 is a bottom plan view of the seat pan of FIG. 33.
Figure 33:
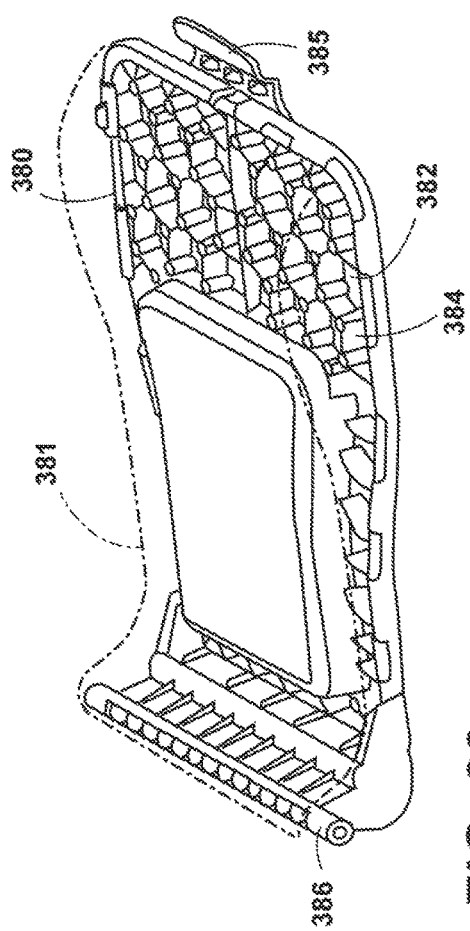
FIG. 33 is a top perspective view of another embodiment of a vehicle seat pan for use with the vehicle seating assembly of the present invention.
Figure 34:
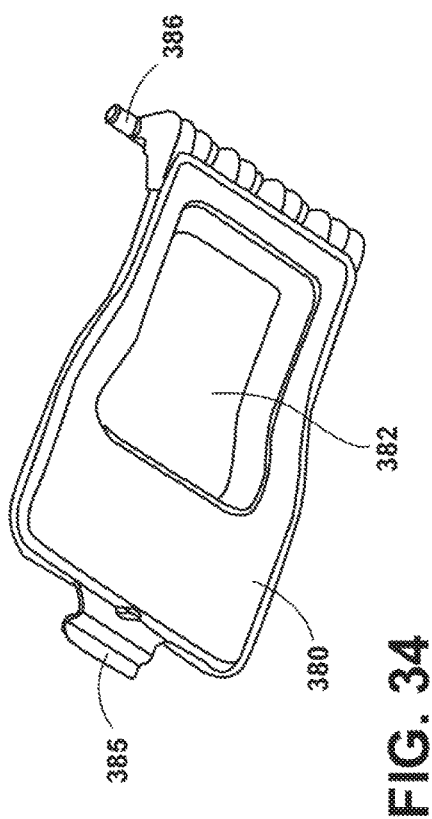
FIG. 34 is a bottom perspective view of the seat pan of FIG. 33.

Referring now to FIGS. 33-35, in yet another embodiment of the present invention, a seat pan 380 is provided that includes a small storage compartment 382 forward on an underside of the seat pan 380. The seat pan 380 includes a matrix of support flanges 384 that are disposed on a top side of the seat pan 380 under a cushion material 381 configured to support the weight of a passenger. The small storage compartment 382 may include a lid or door to secure smaller items inside the small storage compartment 382. A forward portion of the seat pan 380 includes a latch 385 and a rearward portion of the seat pan 380 includes a pivot member 386 designed to engage the frame 316 of the seat 314, such that the seat pan 380 can be rotated between closed and opened positions.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly comprising:
   a seat back including a polymeric support frame having a plurality of forwardly extending connection pins;
   a flexible comfort carrier defining a support matrix of flexible sheet material comprising a multitude of lengthwise horizontal and lengthwise vertical hoops that define openings that expand and contract when loads are applied to the seat back via the flexible comfort carrier, the flexible comfort carrier generally defining a plane on a periphery thereof, the flexible comfort carrier including a plurality of keyhole slots located along the periphery of the flexible comfort carrier and configured to receive the plurality of forwardly extending connection pins, and the flexible comfort carrier defining a plurality of coverstock engagement through holes that are smaller than the keyhole slots and are positioned closer to edges of the flexible comfort carrier than the keyhole slots, wherein the plurality of keyhole slots and the plurality of coverstock engagement through holes are in the plane; and
   a head restraint integrally formed with a single support post and that is operable between an upright use position and a folded-forward storage position.

2. The vehicle seating assembly of claim 1, wherein the support frame includes substantially planar side portions.

3. The vehicle seating assembly of claim 1, wherein the support frame includes a head restraint receiving assembly configured to receive the support post.

4. The vehicle seating assembly of claim 1, wherein the support frame includes side portions with a plurality of slots configured to receive and retain one of a coverstock and a cushion.

5. The vehicle seating assembly of claim 1, wherein each of the plurality of keyhole slots is surrounded by a reinforcement ring.

6. A vehicle seating assembly comprising:
   a seat back including a polymeric body portion defining a forward support frame having a plurality of forwardly extending connection pins; and
   a flexible comfort carrier disposed over a front surface of the polymeric body portion and including a support matrix of flexible sheet material comprising a multitude of lengthwise horizontal and lengthwise vertical hoops that define openings that expand and contract when loads are applied to the seat back via the flexible comfort carrier, the flexible comfort carrier generally defining a plane on a periphery thereof, the flexible comfort carrier also including a plurality of keyhole slots located along the periphery of the flexible comfort carrier and configured to receive the plurality of forwardly extending connection pins, and the flexible comfort carrier defining a plurality of coverstock engagement through holes that are smaller than the keyhole slots and are positioned closer to edges of the flexible comfort carrier than the keyhole slots, wherein the plurality of keyhole slots and the plurality of coverstock engagement through holes are in the plane.

7. The vehicle seating assembly of claim 6, wherein the support frame includes substantially planar side portions.

8. The vehicle seating assembly of claim 6, wherein the support frame includes a head restraint receiving assembly configured to receive support a post having a generally planar construction.

9. The vehicle seating assembly of claim 6, wherein the support frame includes side portions with a plurality of slots configured to receive and retain one of a coverstock and a cushion.

10. The vehicle seating assembly of claim 6, wherein each of the plurality of keyhole slots is surrounded by a reinforcement ring.

* * * * *